US012767211B2

(12) United States Patent
Koba et al.

(10) Patent No.: US 12,767,211 B2
(45) Date of Patent: Oct. 20, 2026

(54) VEHICLE CONTROL DEVICE

(71) Applicant: AISIN CORPORATION, Kariya (JP)

(72) Inventors: Kosuke Koba, Kariya (JP); Akira Takahashi, Kariya (JP); Toshihisa Habiro, Kariya (JP); Kazuki Sugimori, Kariya (JP)

(73) Assignee: AISIN CORPORATION, Kariya (JP)

( * ) Notice: Subject to any disclaimer, the term of this patent is extended or adjusted under 35 U.S.C. 154(b) by 32 days.

(21) Appl. No.: 18/950,833

(22) Filed: Nov. 18, 2024

(65) Prior Publication Data

US 2025/0214644 A1 Jul. 3, 2025

(30) Foreign Application Priority Data

Dec. 28, 2023 (JP) ................................ 2023-222704

(51) Int. Cl.
*B62D 5/04* (2006.01)
*B62D 15/02* (2006.01)

(52) U.S. Cl.
CPC ............ *B62D 5/04* (2013.01); *B62D 15/021* (2013.01)

(58) Field of Classification Search
CPC ........ B62D 5/04; B62D 15/021; B62D 5/046; B62D 5/0481; B62D 5/0496; B62D 7/1581; B62D 6/002; B62D 5/0463; B62D 7/14
See application file for complete search history.

(56) References Cited

FOREIGN PATENT DOCUMENTS

| | | | |
|---|---|---|---|
| JP | 3050060 B2 * | | 6/2000 |
| JP | 3068779 B2 | | 7/2000 |
| JP | 2009-298300 A | | 12/2009 |

OTHER PUBLICATIONS

Machine Translation of JP 3050060 B2 PDF file Name: "JP3050060B2_Machine_Translation.pdf" (Year: 2000).*

* cited by examiner

*Primary Examiner* — Grant Moubry
*Assistant Examiner* — Ruben Picon-Feliciano
(74) *Attorney, Agent, or Firm* — Sughrue Mion, PLLC

(57) ABSTRACT

A vehicle control device including an electric steering actuator generating a steering force for steering a rear wheel; a trapezoidal screw converting rotational motion generated during driving of the steering actuator into linear motion for steering the rear wheel; a target steering angle setter to set a target steering angle of the rear wheel based on steering by a driver; a steering angle detector to detect a current steering angle of the rear wheel; and an energization controller to control an energized state of the steering actuator. The energization controller executes control of alternately switching between an energized state supplying a current to the steering actuator and a cut-off state to cut off current to the steering actuator, when steering in a direction away from neutral and the target steering angle of the rear wheel is different from the current steering angle, and a value of a current gradually increases.

10 Claims, 7 Drawing Sheets

ROTATIONAL MOTION → LINEAR MOTION

FRICTIONAL FORCE > ROTATING FORCE

VEHICLE CONTROL DEVICE

CROSS REFERENCE TO RELATED APPLICATIONS

This application is based on and claims priority under 35 U.S.C. § 119 to Japanese Patent Application 2023-222704, filed on Dec. 28, 2023, the entire content of which is incorporated herein by reference.

TECHNICAL FIELD

This disclosure relates to a vehicle control device for a vehicle capable of controlling a steering angle of a rear wheel.

BACKGROUND DISCUSSION

In the related art, as a vehicle steering method, there is a 2 wheel steering (hereinafter, referred to as 2WS) in which only front wheels are steered, and a 4 wheel steering (hereinafter, referred to as 4WS) in which front wheels and rear wheels are steered, based on steering of a steering wheel by a driver. Although the 4WS has a problem of being more complex in structure compared with the 2WS, the 4WS has many excellent advantages, such as reduced turning radius difference between inner wheels, smaller turning radius, prevention of slipping on frozen roads, and stable lane changing at high speeds.

Here, in a vehicle in which rear wheels are steered as in a case of the 4WS, for example, a target steering angle of a rear wheel is set based on steering of a steering wheel of the vehicle, and when a current steering angle of the rear wheel (hereinafter, referred to as an actual steering angle) is different from the target steering angle, a steering actuator, which serves as a drive source of a steering mechanism, is driven and controlled so that the steering angle approaches the target steering angle. As the steering actuator, for example, an electric motor is used. However, since it is assumed that steering is smooth even during steering of heavy vehicles and during stationary steering when the vehicle is stationary, an output of the electric motor (power consumption) is set to be large. If a large current flows through the electric motor for a long time, there is a problem of reducing a service life due to overheating. For example, JP 2009-298300A (paragraphs 0111-0118, FIG. 14) (Reference 1) proposes a technique for preventing overheating of an electric motor while reducing power consumption by shifting to an intermittent energization mode in which on and off is alternately performed without continuously performing energization, when a difference between an actual steering angle of a rear wheel and a target steering angle is equal to or greater than a threshold value.

In Reference 1, the mode switches to the intermittent energization mode in the case where the difference between the actual steering angle of the rear wheel and the target steering angle is equal to or greater than the threshold value such that it is expected to cause a particularly large amount of current of the electric motor. However, there is a problem that, for example, when a driver steers a steering wheel slowly over a long time, that is, when the difference between the actual steering angle of the rear wheel and the target steering angle is small but the difference between the actual steering angle of the rear wheel and the target steering angle continues to differ for a long time, the mode does not switch to the intermittent energization mode. Here, since a heat generation amount of the electric motor is proportional to a square of a time integral of a current flowing through a motor inverter, even if the difference between the actual steering angle of the rear wheel and the target steering angle is small, when the steering wheel is steered slowly and continuously and the current continues to flow for a long time, the heat generation amount becomes very large.

A need thus exists for a vehicle control device which is not susceptible to the drawback mentioned above.

SUMMARY

A vehicle control device according to this disclosure includes: an electric steering actuator configured to generate a steering force for steering a rear wheel; a trapezoidal screw configured to convert rotational motion generated based on drive of the steering actuator into linear motion in an axial direction for steering the rear wheel; a target steering angle setting unit configured to set a target steering angle of the rear wheel based on steering of a steering wheel by a driver; a steering angle detection unit configured to detect a current steering angle of the rear wheel; and an energization control unit configured to control an energized state of the steering actuator. The energization control unit executes control of alternately switching between an energized state in which a current is supplied to the steering actuator and a cut-off state in which the current to the steering actuator is cut off, when steering is being performed in a direction away from a neutral and the target steering angle of the rear wheel is different from the current steering angle of the rear wheel, and a value of a current supplied to the steering actuator in the energized state gradually increases with time.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
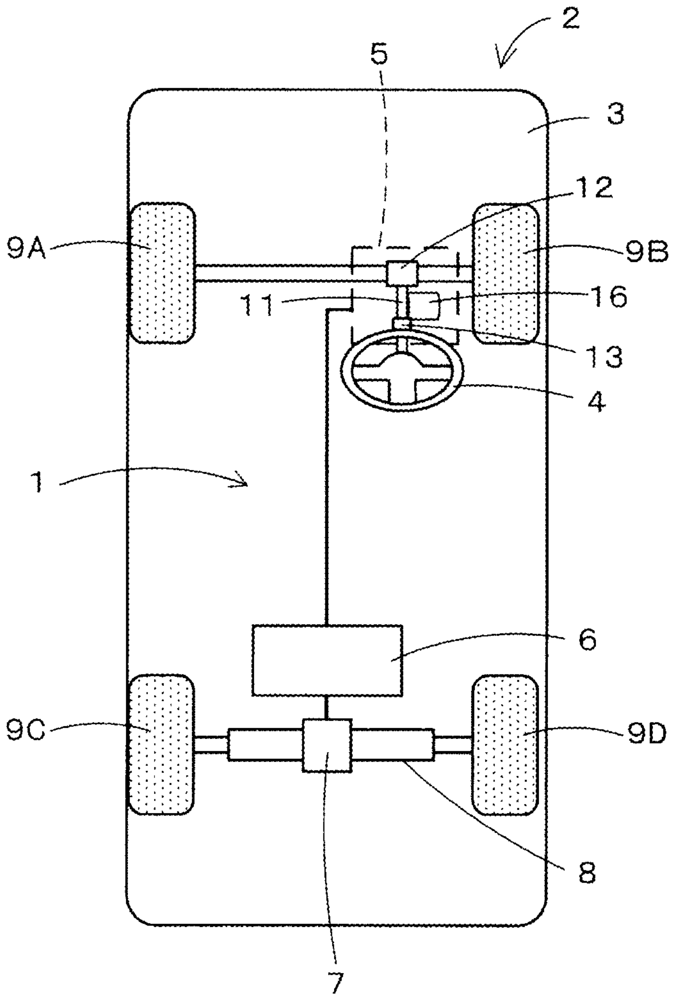
FIG. 1 is a schematic configuration diagram of a vehicle according to the present embodiment.

Hereinafter, a vehicle control device according to an embodiment disclosed here will be described in detail with reference to the drawings. First, a vehicle 2 equipped with a vehicle control device 1 according to the present embodimentment will be described below. FIG. 1 is a schematic configuration diagram of the vehicle 2 according to the present embodiment.

Here, the vehicle 2 may be, for example, an automobile (an internal combustion engine automobile) using an internal combustion engine (an engine, or the like) as a drive source, an automobile (an electric automobile, a fuel cell automobile, or the like) using an electric motor (a motor or the like) as a drive source, or an automobile (a hybrid automobile) using both of the internal combustion engine and the electric motor as a drive source. Regardless of a type of the vehicle, the vehicle may be an ordinary vehicle, a large truck for commercial use, a bus, or the like. A forklift, a construction machine, or the like may be used as long as front and rear wheels are provided.

In particular, the vehicle 2 in the present embodiment is a vehicle that adopts, as a steering method, 4 wheel steering (hereinafter, referred to as 4WS) in which steering angles of front and rear wheels are respectively controlled based on steering of a steering wheel by a driver. 4WS configurations include a mechanical type, in which steering of the front wheels is mechanically transmitted to the rear wheels via an input gearbox on a front wheel side and a steering gearbox on a rear wheel side, and an electronically controlled type, in which the rear wheels are steered by electric control by controlling actuators, various valves, or the like based on a steering amount. In the present embodiment, an example using the electronically controlled type will be described. That is, it is assumed that the steering wheel and the rear wheels are not mechanically connected, but are connected by wire (electrical communication).

As shown in FIG. 1, the vehicle 2 includes a vehicle body 3, a steering wheel 4 to be operated by a driver, a power steering device 5 that assists in steering the steering wheel 4, a rear wheel steering electronic control unit (ECU) 6, a rear wheel steering device 8 that includes an electric motor (steering actuator) 7 as a drive source, converts rotational motion of the electric motor 7 into linear motion in an axial direction for steering the rear wheels, and then steers the rear wheels, and wheels 9A to 9D. In the following description, a left front wheel is referred to as 9A, a right front wheel is referred to as 9B, a left rear wheel is referred to as 9C, and a right rear wheel is referred to as 9D. The vehicle control device 1 includes the power steering device 5, the rear wheel steering ECU 6, the electric motor 7, the rear wheel steering device 8, and other control portion related to control over the wheels 9A to 9D.

The "actuator" may generally refer to those including a mechanism for transmitting or converting a drive force from a drive source in addition to a drive source such as a motor, or may refer to only a drive source portion separately from the mechanism for transmitting or converting the drive force. The latter is used in the following description. That is, in the present embodiment, only the electric motor 7 of the rear wheel steering device 8 is referred to as a steering actuator.

Hereinafter, each component in the vehicle 2 will be described. First, the steering wheel 4 is provided in a seat of a driver, and is a steering wheel that changes a traveling direction of the vehicle 2 by being gripped and turned by a driver. Basically, when the traveling direction is changed to a right direction, the steering wheel 4 is turned to the right direction (clockwise), and when the traveling direction is changed to a left direction, the steering wheel 4 is turned to the left direction (counterclockwise). The power steering device 5 is connected to a steering shaft 11 connected to the steering wheel 4. After providing assistance from the power steering device 5, a rack gear and a pinion gear 12 at a tip end of the steering shaft 11 is driven in response to turning of the steering wheel 4, thereby displacing a steering angle of the front wheels 9A, 9B in a direction corresponding to a turning direction of the steering wheel 4.

A torque sensor 13 is provided on the steering shaft 11 to detect a steering torque related to an operation of the steering wheel 4 by the driver and transmit the steering torque to the power steering device 5 and the rear wheel steering ECU 6. The torque sensor 13 is capable of detecting a steering angle and an angular velocity of the steering angle in addition to the steering torque, and these pieces of information are also transmitted. The power steering device 5 controls a torque (steering assist force) applied to the steering shaft 11 based on the steering torque, the steering angle, and the angular velocity of the steering angle detected by the torque sensor 13. The rear wheel steering ECU 6 controls a steering angle of the rear wheels 9C, 9D based on the steering torque, the steering angle, and the angular velocity of the steering angle detected by the torque sensor 13.

Steering angle control for the 4WS includes, for example, in-phase control, which controls the steering angles of the front and rear wheels in the same direction, and opposite phase control, which controls the steering angles of the front and rear wheels in opposite directions. Either control is selected appropriately based on an operation of the driver or judgment on a vehicle side depending on a situation of the vehicle. As an example, when changing lanes at a high speed or when traveling on a frozen road, the in-phase control is executed to improve stability, and when turning at low speed, the opposite phase control is executed to reduce a turning radius.

On the other hand, the power steering device 5 is a device that assists steering of the steering wheel 4, and is roughly divided into hydraulic, electro-hydraulic and electric types, with the electric type being particularly adopted in the present embodiment. The electric type is further divided into a column assist type, a pinion assist type, and a rack assist type depending on a position of a motor 16 that assists the steering, and any type may be adopted. The following description will be given using the column assist type as an example.

In the power steering device 5, the motor 16 is driven after a current amount is adjusted according to a steering torque, a steering angle, and an angular velocity of the steering angle detected by the torque sensor 13. The motor 16 is connected to the steering shaft 11 via a worm gear and a wheel gear. When the motor 16 is driven, a torque is applied to the steering shaft 11 to assist the driver in steering of the steering wheel.

The rear wheel steering ECU 6 is a control device that controls the steering angles of the rear wheels 9C, 9D according to a steering torque, a steering angle, and an angular velocity of the steering angle detected by the torque sensor 13. In particular, in the present embodiment, a current supplied to the electric motor 7 is also controlled as described later. The rear wheel steering ECU 6 is connected to the power steering device 5, the electric motor 7, various sensors in the rear wheel steering device 8, and the torque sensor 13 via an in-vehicle network such as a CAN. The rear wheel steering ECU 6 is also connected to a vehicle speed sensor, an acceleration sensor, and the like mounted on the vehicle 2. Details of the rear wheel steering ECU 6 will be described later.

Figure 2:
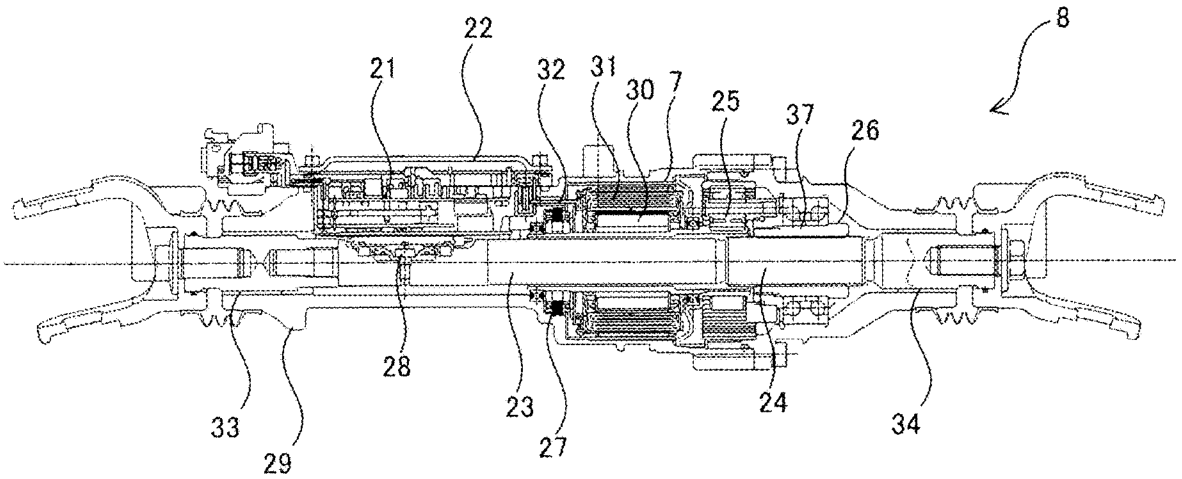
FIG. 2 is a cross-sectional view of a rear wheel steering device according to the present embodiment taken along a rotation axis of a drive shaft (rear wheel shaft)

The electric motor 7 is incorporated as a part of the rear wheel steering device 8, and is a drive source that generates a steering force for steering the rear wheels. The rear wheel steering device 8 is a drive mechanism for converting rotational motion of the electric motor 7 into linear motion in the axial direction for steering the rear wheels. Hereinafter, the electric motor 7 and the rear wheel steering device 8 will be described in more detail with reference to FIG. 2. FIG. 2 is a cross-sectional view of the rear wheel steering device 8 taken along a rotation axis of a drive shaft (rear wheel shaft).

As shown in FIG. 2, the rear wheel steering device 8 includes an ECU folder 22 for accommodating and fixing a board 21 on which the rear wheel steering ECU 6 is disposed, the electric motor 7, a drive shaft 23 that is rotatably supported inside the rear wheel steering device 8 and rotationally driven by the electric motor 7, a planetary gear 25 that uses the drive shaft 23 as an input shaft, and uses a drive shaft 24 having the same rotation axis as that of the drive shaft 23 as an output shaft, while reducing a rotation speed and increasing a torque, a trapezoidal screw 26 that converts rotational motion of the drive shaft 24 having the reduced rotation speed and the increased torque into linear motion in the axial direction to move the drive shafts 23, 24 together in the axial direction, a resolver 27 that detects a rotation angle of a rotor of the electric motor 7, a stroke sensor 28 that detects left and right positional deviations from normal positions of the drive shafts 23, 24 (the positions of the drive shafts 23, 24 at which the rear wheels are directed in a straight traveling direction), and a cylindrical housing (casing) 29 that accommodates the above members. In the example shown in FIG. 2, the rear wheel steering ECU 6 is incorporated as a part of the rear wheel steering device 8, but the rear wheel steering ECU 6 may be disposed separately from the rear wheel steering device 8.

Here, the electric motor 7 is, for example, a brushless motor, and includes a rotor 30 having a cylindrical permanent magnet disposed on an outer circumferential surface thereof, and a stator 31 disposed therearound and provided with a plurality of coils. The rotor 30 is coaxial with and integrated with the drive shaft 23, and as a current flows through the coil of the stator 31, the rotor 30 rotates, and the drive shaft 23 also rotates accordingly.

The electric motor 7 also has a motor drive circuit 32, which is, for example, an inverter circuit or an H-bridge circuit made up of switching elements (not shown), and an on-off state of switching elements is controlled by a control signal from the rear wheel steering ECU 6, and power is supplied to the electric motor 7 in accordance with the control signal. In particular, it is possible to control a rotation direction and a torque of the rotor 30. The motor drive circuit 32 includes a motor current sensor 46. The motor current sensor 46 detects a value of a current flowing from the motor drive circuit 32 to the electric motor 7, and outputs a signal representing the current value to the rear wheel steering ECU 6.

The planetary gear 25 is implemented by combining a plurality of gears such as a sun gear, a planetary gear, a planetary carrier that picks up orbital motion of the planetary gear, and an internal gear. A gear ratio can be set according to the number of teeth on each gear. In particular, in the present embodiment, the drive shaft 23 that is rotationally driven by the electric motor 7 is used as the input shaft, and the rotation speed is reduced and then the torque is increased to convert the rotational drive into rotational drive of the drive shaft 24 (output shaft) having the same rotation axis as the drive shaft 23. The drive shafts 23, 24 are supported by bearings 33, 34 formed at both left and right ends of the housing 29 so as to be rotatable and integrally movable in the axial direction, and both ends are connected to the rear wheel 9C and rear wheel 9D via tie rods, knuckle arms, and the like (not shown). The drive shafts 23, 24 also correspond to rear wheel shafts.

Figure 3:
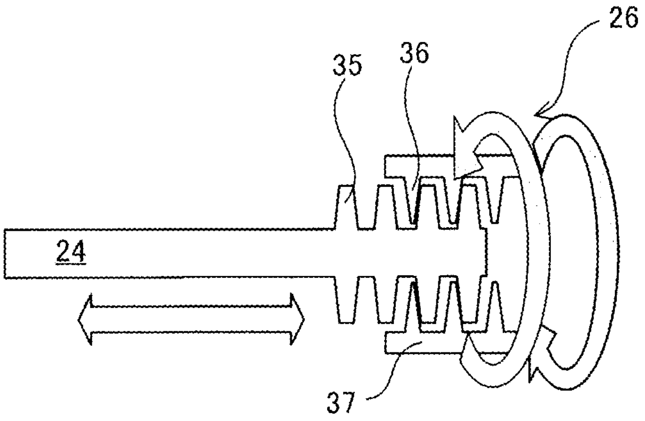
FIG. 3 is a diagram showing a trapezoidal screw.

The trapezoidal screw 26 is a screw mechanism that converts the rotational drive of the drive shaft 24, which is reduced in speed and increased in torque by the planetary gear 25, into linear motion in the axial direction for steering the rear wheels. Specifically, as shown in FIG. 3, a projection portion (screw thread) 35 formed in a spiral shape on an outer periphery of the drive shaft 24 and having a trapezoidal cross section, and a nut 37 in which a recessed portion 36 corresponding to the projection portion 35 is similarly formed in a spiral shape on an inner surface are included. The nut 37 is fixed to the housing 29, that is, the vehicle body 3 of the vehicle, while the drive shafts 23, 24 are supported by the bearings 33, 34 formed on both the left and right ends of the housing 29 so as to be rotatable and movable in the axial direction. Accordingly, when the drive shaft 24 rotates, the projection portion 35 and the recessed portion 36 mesh with each other, so that the drive shaft 24 moves in the axial direction with respect to the nut 37, that is, the vehicle body 3 of the vehicle. As described above, both the ends of the drive shafts 23, 24 are connected to the rear wheels 9C, 9D via tie rods, knuckle arms, and the like, and the rear wheel 9C, 9D are steered by displacement of the drive shafts 23, 24 in the axial direction. That is, the rear wheels 9C, 9D can be steered by rotational drive of the drive shafts 23, 24 by the electric motor 7. A rotation direction of the rotor 30 of the electric motor 7 determines a left-right movement direction of the drive shafts 23, 24, that is, a steering direction of the rear wheels 9C, 9D. A rotation angle of the rotor 30 determines a left-right movement amount of the drive shafts 23, 24, that is, a steering angle of the rear wheels 9C, 9D.

Figure 4:
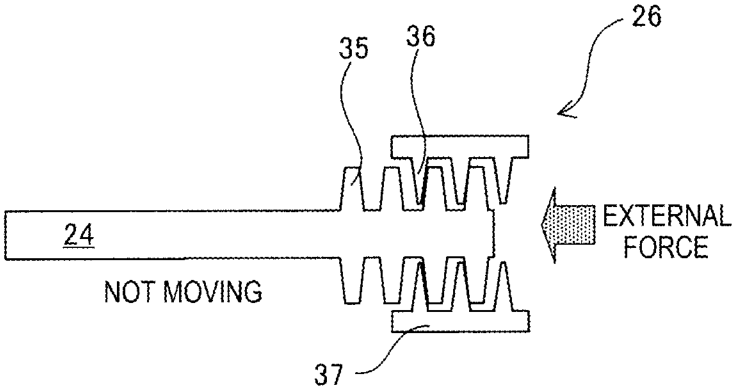
FIG. 4 is a diagram showing the trapezoidal screw.

As shown in FIG. 4, the trapezoidal screw 26 is designed such that when rotation of the drive shaft 24 is stopped, even if an external force is applied to the drive shaft 24 in the axial direction, a frictional force generated between the projection portion 35 and the recessed portion 36 due to the external force, that is, a frictional force acting in a direction in which the drive shaft 24 does not rotate, is larger than an external force component acting in a direction in which the drive shaft 24 rotates. That is, even if a strong external force is applied to the drive shaft 24 in the axial direction, the drive shaft 24 does not rotate and does not move in the axial direction. That is, when the electric motor 7 is stopped, even when the vehicle travels in that state, a current steering angle is maintained without returning a steering angle of the rear wheel to a straight traveling direction.

The resolver 27 is a sensor that is disposed near the rotor 30 of the electric motor 7 and detects the rotation angle of the rotor 30 of the electric motor 7. The resolver 27 is, for example, a combination of an induction coil and a detection coil that face each other, and the induction coil is disposed relative to the rotor 30. When the electric motor 7 is driven and the rotor 30 rotates, the induction coil also rotates integrally. When the induction coil rotates, a magnetic field detected by the detection coil changes, and a change amount of the magnetic field can be used to detect a change amount of a rotation angle of the induction coil, that is, a change amount of the rotation angle of the rotor 30. As described above, the steering angle of the rear wheels 9C, 9D is determined by the rotation angle of the rotor 30 of the electric motor 7, so that the rear wheel steering ECU 6 can also detect the steering angle of the rear wheels by detecting the rotation angle of the rotor 30 with the resolver 27. However, because the resolver 27 can only detect a steering angle change amount (relative steering angle), a detection result of the stroke sensor 28, which will be described later, is also required to detect a current steering angle (actual steering angle) of the rear wheels 9C, 9D.

On the other hand, the stroke sensor 28 includes, for example, a combination of a Hall element and a permanent magnet. A permanent magnet is disposed with respect to the drive shafts 23, 24, a Hall element is fixed to a housing 29 side. The drive shafts 23, 24 are designed so that the Hall element and the permanent magnet are positioned to face each other when the drive shafts 23, 24 are in a normal position (positions of the drive shafts 23, 24 in which the rear wheels are oriented in a straight traveling direction). When the electric motor 7 is driven, and motion is converted into linear motion in the axial direction by the trapezoidal screw 26 to cause the drive shafts 23, 24 to shift in a left-right direction from the normal position, the magnetic field is changed, causing a change in current amount of a Hall current generated by the Hall element. Since the current amount of the Hall current changes according to a deviation amount of the drive shafts 23, 24 from the normal position, it is possible to detect the deviation amount by detecting the current amount of the Hall current. The rear wheel steering ECU 6 can specify an initial steering angle value based on a detection signal of the stroke sensor 28 when an ignition is on, and can calculate an actual steering angle of the rear wheels 9C, 9D based on a steering angle change amount (relative steering angle) from the initial steering angle value obtained based on an output signal from the resolver 27.

In addition to the components shown in FIG. 1, the vehicle 2 includes basic components as the vehicle 2. However, only steering of the wheels 9A to 9D, only a configuration related to steering and control of the wheels 9A to 9D and control related to the configuration will be described.

Figure 5:
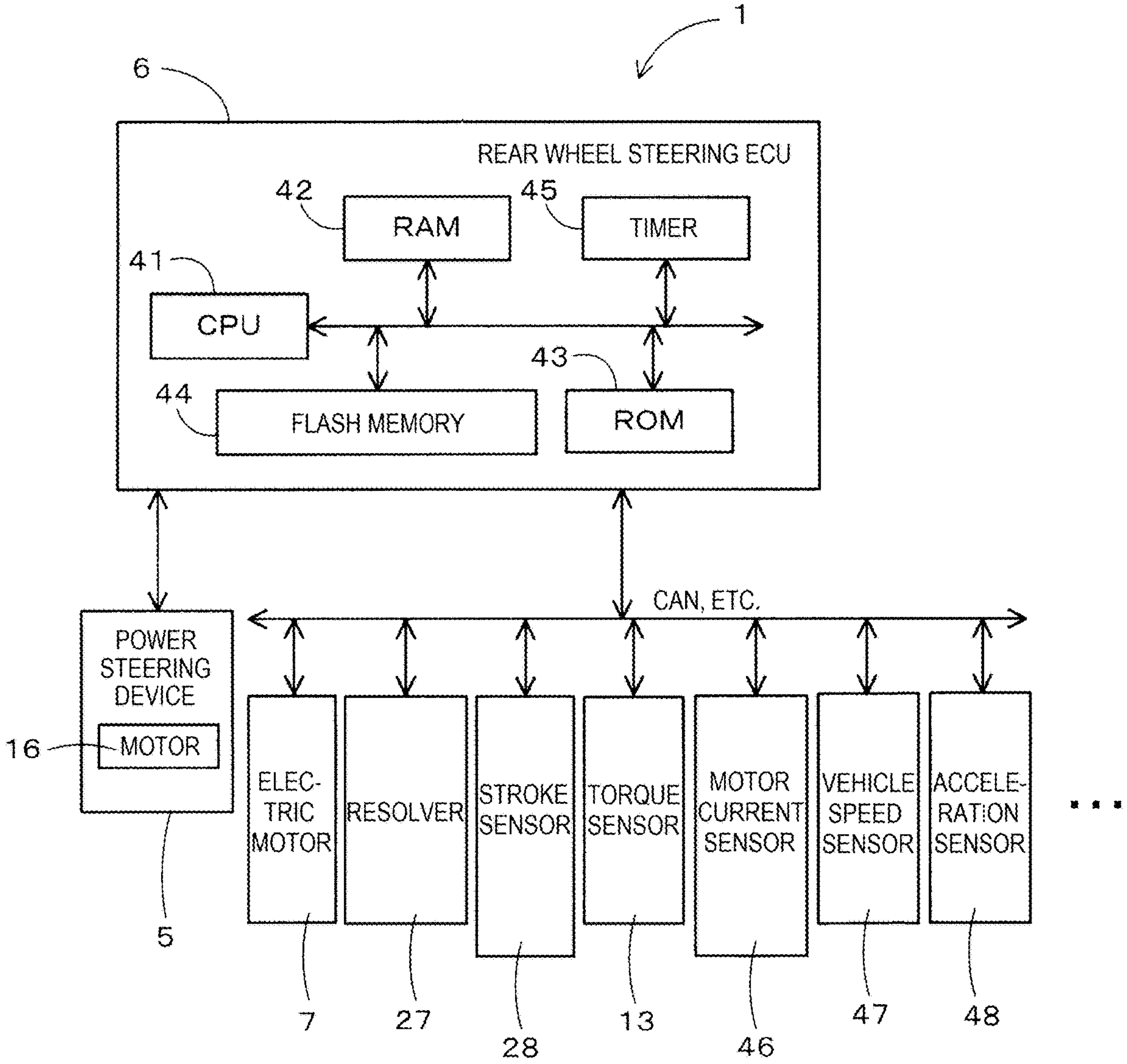
FIG. 5 is a block diagram showing a configuration of a vehicle control device according to the present embodiment.

Next, a configuration of the vehicle control device 1 will be described in more detail with reference to FIG. 5. FIG. 5 is a block diagram showing the configuration of the vehicle control device 1 according to the present embodiment.

The vehicle control device 1 according to the present embodiment includes the above-described power steering device 5, rear wheel steering ECU 6, electric motor 7, and another control portion related to the control over the wheels 9A to 9D. In particular, the rear wheel steering ECU 6 is an electronic control unit (ECU) that executes various kinds of control related to traveling of the vehicle such as steering angle control of the rear wheels 9C, 9D, and has various units as a processing algorithm together with the power steering device 5 and other control units in the vehicle control device 1. For example, a target steering angle setting unit sets a target steering angle of the rear wheel based on steering of the steering wheel by the driver. A steering angle detection unit detects a current steering angle of the rear wheel. An energization control unit controls an energized state of the electric motor 7.

Specifically, as shown in FIG. 5, there are provided internal storage devices such as a CPU 41 serving as a calculation device and a control device, a RAM 42 used as a working memory when the CPU 41 executes various kinds of calculation processing, a ROM 43 in which a vehicle control processing program (see FIG. 6) described later and the like are recorded in addition to a control program, and a flash memory 44 that stores a program read from the ROM 43. A timer 45 serving as a unit that measures time is also provided. On the other hand, the rear wheel steering ECU 6 is also connected to, via an in-vehicle network such as a CAN, the power steering device 5, the electric motor 7, the resolver 27, the stroke sensor 28, the torque sensor 13, the motor current sensor 46, a vehicle speed sensor 47, an acceleration sensor 48, and the like that are provided in the vehicle 2.

The vehicle speed sensor 47 is a sensor for detecting a travel distance and a vehicle speed of the vehicle 2, generates a pulse according to rotation of a drive wheel of the vehicle 2, and outputs a pulse signal to the rear wheel steering ECU 6. The acceleration sensor 48 detects acceleration occurring in a front-rear direction (direction parallel to a traveling direction of the vehicle) and a left-right direction (direction intersecting the traveling direction of the vehicle) with respect to the vehicle body of the vehicle 2, and outputs the acceleration to the rear wheel steering ECU 6. The rear wheel steering ECU 6 can calculate a vehicle speed and a travel distance of the vehicle by counting pulses output from the vehicle speed sensor 47, and sets a target steering angle of the rear wheels 9C, 9D based on a steering angle and angular velocity of the steering angle detected by the torque sensor 13, a vehicle speed detected by the vehicle speed sensor 47, acceleration detected by the acceleration sensor 48, and the like. As described above, the rear wheel steering ECU 6 can calculate an actual steering angle of the rear wheels 9C, 9D based on detection results of the resolver 27 and the stroke sensor 28, and controls a steering angle of the rear wheels 9C, 9D such that the actual steering angle approaches a target rear wheel steering angle of the rear wheels 9C, 9D.

Figure 6:
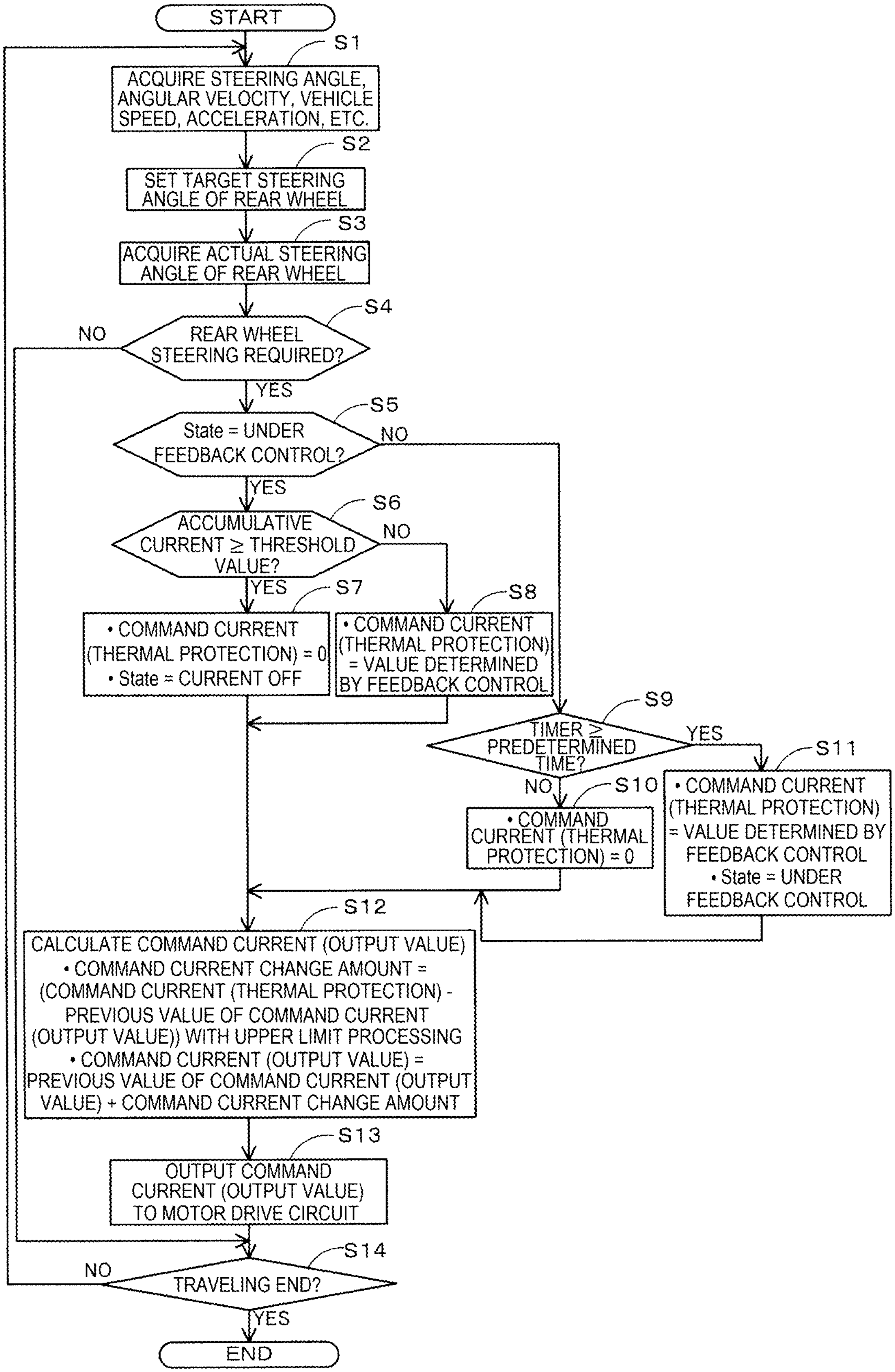
FIG. 6 is a flowchart of a vehicle control processing program according to the present embodiment.

Next, a vehicle control processing program executed particularly by the rear wheel steering ECU 6 in the vehicle control device 1 having the above-described configuration will be described with reference to FIG. 6. FIG. 6 is a flowchart of a vehicle control processing program according to the present embodiment. Here, the vehicle control processing program is a program that is executed after an accessory power supply (ACC power supply) of the vehicle is turned on, and executes various kinds of control related to traveling of the vehicle, such as steering angle control of the rear wheels 9C, 9D. The program shown in the flowchart in FIG. 6 is stored in the RAM 42, the ROM 43, or the like of the rear wheel steering ECU 6, and is executed by the CPU 41.

First, in step (hereinafter abbreviated as S) 1, the CPU 41 acquires a steering angle and an angular velocity of the steering angle detected by the torque sensor 13, that is, a steering content of the steering wheel by the driver, via the CAN. Further, information related to a current vehicle behavior such as a vehicle speed detected by the vehicle speed sensor 47 and acceleration detected by the acceleration sensor 48 is also acquired in a similar manner.

Subsequently, in S2, the CPU 41 sets a target steering angle of the rear wheels 9C, 9D (hereinafter referred to as a target rear wheel steering angle) using the steering angle, the angular velocity of the steering angle, the vehicle speed, the angular velocity, and the like acquired in S1. The target rear wheel steering angle is set after it is determined which of in-phase control in which the steering angles of the front and rear wheels are controlled in the same direction and opposite phase control in which the steering angles of the front and rear wheels are controlled in opposite directions is executed. For example, when the vehicle changes lanes at a high speed or travels on a frozen road, the in-phase control is executed to improve stability, and when the vehicle turns at low speed, the opposite phase control is executed to reduce a turning radius. For the determination, information related to the vehicle behavior acquired in S1 is used. Whether to execute the in-phase control or the opposite phase control may be determined by an operation of the driver instead of automatically determining whether to execute the in-phase control or the opposite phase control on the vehicle side.

In in-phase control, for example, the target rear wheel steering angle is set so that the steering angle is the same as a steering angle of the front wheel. In the opposite phase control, the target rear wheel steering angle is set so that the steering angle of the rear wheel is approximately 1/10 to 1/20 of the steering angle of the front wheel in an opposite direction. The above example is an example, and an optimal target rear wheel steering angle is set according to a current vehicle situation.

Figure 7:
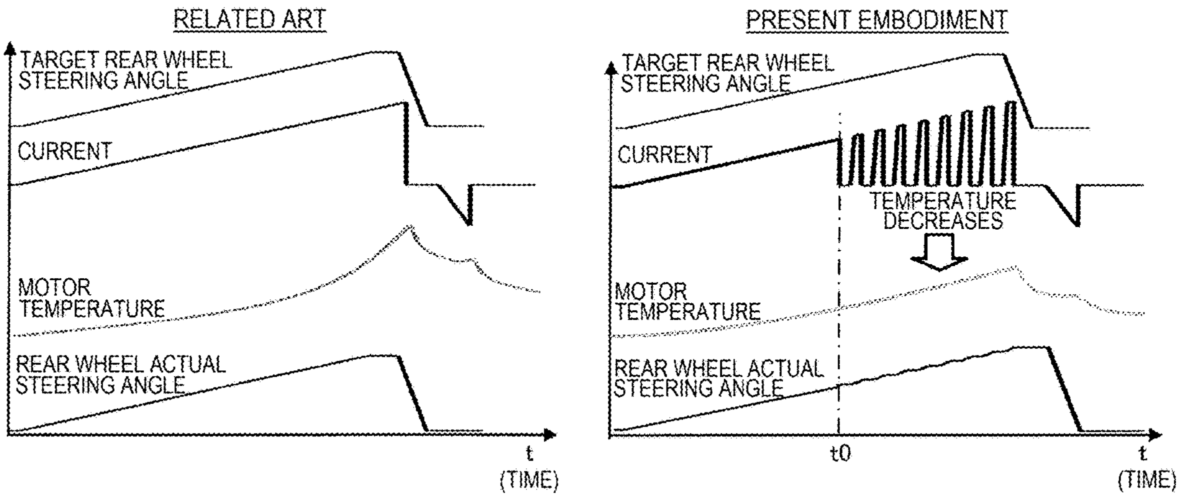
FIG. 7 is a diagram showing a comparison between current control of an electric motor according to the related art and according to the present embodiment.

Processing from S1 onwards is repeatedly executed while the vehicle is traveling (for example, every 10 msec), and the target rear wheel steering angle is set based on a steering angle at each time. Here, when changing a traveling direction of the vehicle, the driver operates the steering wheel so as to gradually increase the steering angle, or conversely, so as to gradually decrease the steering angle. Accordingly, as shown in FIG. 7, when the traveling direction of the vehicle is changed at the time of turning or lane change, the target rear wheel steering angle is basically not fixed, and gradually changes in accordance with a steering wheel operation of the vehicle (the target rear wheel steering angle changes over time).

Thereafter, in S3, the CPU 41 acquires a current steering angle of the rear wheel (actual steering angle). Here, the actual steering angle of the rear wheel is acquired using detection results of the resolver 27 and the stroke sensor 28 as described above. Specifically, the initial steering angle value is specified based on a detection signal of the stroke sensor 28 when the ignition is on, and an actual steering angle of the rear wheels 9C, 9D is calculated based on a steering angle change amount (relative steering angle) from the initial steering angle value obtained based on an output signal from the resolver 27.

Next, in S4, the CPU 41 determines whether the target rear wheel steering angle set in S2 is different from the actual steering angle of the rear wheel acquired in S3, that is, whether steering of the rear wheels (change in the steering angle) is necessary.

If the target rear wheel steering angle set in S2 is different from the actual steering angle of the rear wheel acquired in S3, that is, if it is determined that steering of the rear wheels is necessary (S4: YES), the processing proceeds to S5 to steer the rear wheels. In contrast, if it is determined that the target rear wheel steering angle set in S2 and the actual steering angle of the rear wheel acquired in S3 are the same, that is, if it is determined that steering of the rear wheels is not necessary (S4: NO), the processing proceeds to S14 without steering the rear wheels (while maintaining a current steering angle). In this case, no current is supplied to the electric motor 7, and the drive shafts 23, 24 neither rotate nor move in the axial direction. As shown in FIG. 4, in the present embodiment, the trapezoidal screw 26 is provided in the rear wheel steering device 8, and when the electric motor 7 is not driven, even if a large force is applied from an outside, a current steering angle of the rear wheels (that is, the actual steering angle matching the target rear wheel steering angle) is maintained.

In S5, the CPU 41 reads out State, which is a parameter indicating a current control state by the vehicle control device 1, from the RAM 42, and determines whether State is "under feedback control". The State is set by switching between two states, "under feedback control" and "current off" according to an accumulative current and an elapse of time in processing from S6 onwards to be described later. An initial state value at a time when ACC power supply is turned on is "under feedback control".

Here, in the vehicle control device 1 according to the present embodiment, when the target rear wheel steering angle is different from the current actual steering angle of the rear wheels, control is executed from S5 onwards so that the actual steering angle approaches the target steering angle, and in particular, based on an accumulative current supplied to the electric motor 7, control is executed to alternately switch between "an energized state in which a current is supplied to the electric motor 7 so that the current steering angle of the rear wheels approaches the target steering angle" and "a cut-off state in which a current to the electric motor 7 is cut off".

As a result, as shown in FIG. 7, in the related art, when the target rear wheel steering angle is different from the current actual steering angle of the rear wheels, for example, when a steering wheel operation is performed and the target steering angle is changing over time, a current is continuously supplied to the electric motor 7, which causes a problem of overheating and shortening a service life of the electric motor 7. Here, since a heat generation amount of the electric motor is proportional to a square of a time integral of a current flowing through a motor inverter, even if the difference between the actual steering angle of the rear wheel and the target rear wheel steering angle is small, if the steering wheel is steered slowly and continuously and the current continues to flow for a long time, the heat generation amount becomes very large.

In the present embodiment, when the target rear wheel steering angle is different from the current actual steering angle of the rear wheels, for example, when a steering wheel operation is performed and the target steering angle is changing over time, a current is not continuously supplied to the electric motor 7, and control is executed to alternately switch between the energized state and the cut-off state based on the accumulative current supplied to the electric motor 7. Accordingly, it is possible to reduce a heat generation amount even when the steering wheel is steered slowly and continuously. As shown in FIG. 7, until the accumulative current supplied to the electric motor 7 after start of the steering angle control of the rear wheels reaches a preset control start value (until time to), that is, in a stage in which a heat generation amount is low immediately after start of the drive of the electric motor 7, it is not necessary to reduce the heat generation amount, and the control of continuously supplying the current to the electric motor 7 is executed as in the related art. A case where the State is "under feedback control" in S5 indicates that the state is the energized state in current time, and a case where the State is "current off" indicates that the state is the cut-off state.

If the State is "under feedback control" (S5: YES), the processing proceeds to S6. In contrast, if the State is "current off" (S5: NO), the processing proceeds to S9.

In S6, the CPU 41 determines whether the accumulative current supplied to the electric motor 7 reaches a threshold value after the energized state of the electric motor 7 is started. As shown in FIG. 7, control is executed to continuously supply a current to the electric motor 7 until the accumulative current supplied to the electric motor 7 after rear wheel steering angle control is started reaches a preset control start value (until t0), so that the threshold value in S6 is set to a control start value that is larger than a normal value until the first YES is determined in S6 immediately after starting the rear wheel steering angle control. The control start value is, for example, an accumulative current supplied to the electric motor 7 until the electric motor 7 reaches a predetermined temperature (for example, 60 degrees). On the other hand, during control of alternately switching between the energized state and the cut-off state (after t0), it is determined whether the accumulative current supplied to the electric motor 7 after the most recent return from the cut-off state to the energized state reaches a threshold value (<control start value). A value of a current flowing through the electric motor 7 can be detected by the motor current sensor 46. The control start value and the threshold value as a determination reference in S6 can be appropriately set, and for example, the value can be changed according to a vehicle type, specifications of the electric motor 7, a traveling environment of the vehicle, and the like.

If it is determined that the accumulative current supplied to the electric motor 7 since start of the energized state of the electric motor 7 reaches the threshold value (S6: YES), the processing proceeds to S7. In contrast, if it is determined that the accumulative current supplied to the electric motor 7 since the start of the energized state of the electric motor 7 does not reach the threshold value (S6: NO), the processing proceeds to S8.

In S7, the CPU 41 assigns 0 as a value of "command current (thermal protection)". The "command current (thermal protection)" is a value indicating a value of a current to be supplied to the electric motor 7 at the current time, but the "command current (thermal protection)" is not necessarily indicated to the motor drive circuit 32 as a control signal, but is corrected in S12 to be described later so that there is no rapid change in current, and then output to the motor drive circuit 32 as a control signal (S13).

In S7, the CPU 41 reads out State, which is a parameter indicating a current control state of the vehicle control device 1, from the RAM 42, and sets "current off" indicating that the vehicle control device 1 shifts to the cut-off state. Thereafter, the processing proceeds to S12.

On the other hand, in S8, the CPU 41 assigns, as a value of the "command current (thermal protection)", a value of a current that is required to be supplied to the electric motor 7 in order to bring a current actual steering angle of the rear wheels close to the target rear wheel steering angle. Here, the current value assigned in S8 is determined based on a current actual steering angle and a difference between the current actual steering angle and the target rear wheel steering angle. That is, the larger the steering angle, the greater a torque required to further change the steering angle from that steering angle, and therefore, as the actual steering angle increases, the current value that is required to be supplied to the electric motor 7 to steer also increases. The larger the difference between the actual steering angle and the target rear wheel steering angle, the greater a torque is required to quickly approach the target rear wheel steering angle. Therefore, as the difference between the actual steering angle and the target rear wheel steering angle becomes larger, a value of a current that is required to be supplied to the electric motor 7 in order to approach the target rear wheel steering angle also becomes larger. In particular, in the present embodiment, an actual steering angle is detected in real time using the resolver 27 and the stroke sensor 28 to execute feedback control, and a value of a current that is required to be supplied to the electric motor 7 to bring a current actual steering angle of the rear wheels close to the target rear wheel steering angle is set based on the feedback control. Similarly to S7, the "command current (thermal protection)" is not necessarily indicated to the motor drive circuit 32 as a control signal, but is corrected in S12 to be described later so that there is no rapid change in current, and then output to the motor drive circuit 32 as a control signal (S13). Thereafter, the processing proceeds to S12.

On the other hand, in S9, the CPU 41 measures an elapsed time from when the state transitions to the cut-off state (State= "current off") using the timer 45, and determines whether a timer value is equal to or more than a predetermined time. The predetermined time as the determination reference in S9 can be set as appropriate, but it is desirable to set the predetermined time as short as possible within a range in which the heat generation of the electric motor 7 can be reduced so that the driver does not notice that current is cut off. For example, the time is 100 msec.

Figure 8:
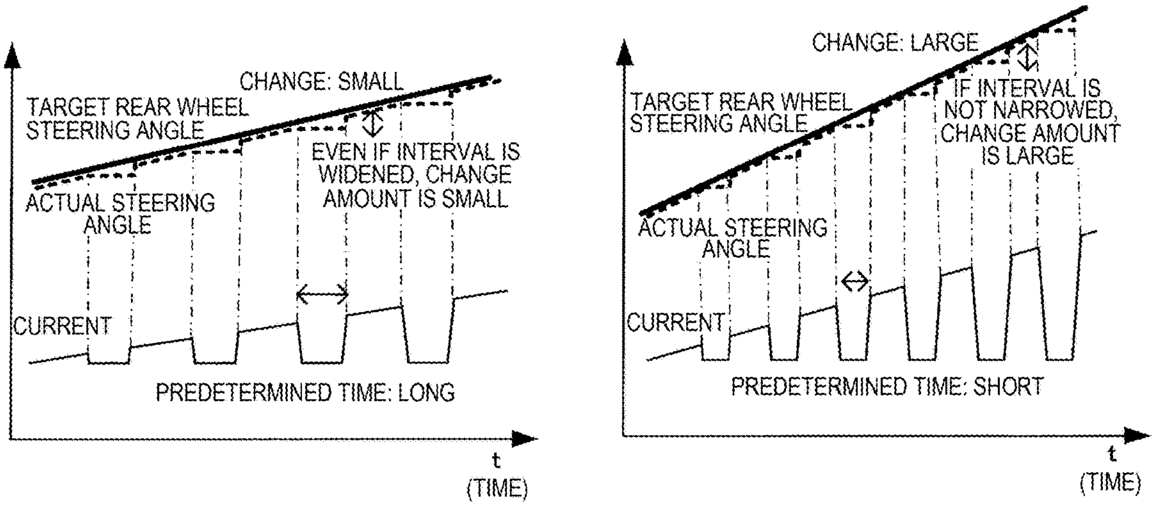
FIG. 8 is a diagram showing a method of setting a time for cutting off a current.

In the present embodiment, when the target rear wheel steering angle changes over time, as shown in FIG. 8, it is desirable to set the predetermined time for cutting off the current shorter as the change rate becomes faster. A reason why such a setting is made is that the actual steering angle does not change when the current is cut off, and the difference between the target rear wheel steering angle and the actual steering angle basically increases as a time for cutting off the current becomes longer, and the actual steering angle changes greatly when the state returns from the cut-off state to the energized state. However, if a change amount in the actual steering angle becomes large (a step of a broken line indicating the actual steering angle in FIG. 8 becomes large), there is a possibility that the driver may notice that the current is cut off, and thus it is desirable to reduce the change amount. As shown in a left diagram of FIG. 8, if a change rate of the target rear wheel steering angle is slow, a change amount of the actual steering angle when a current is restored can be reduced even if a period during which the current is cut off is long, so a current cutoff time can be set long. On the other hand, as shown in a right diagram of FIG. 8, if a change rate of the target rear wheel steering angle is fast, a change amount of the actual steering angle when a current is restored becomes large if a period during which the current is cut off is long, and therefore, it is necessary to set a current cutoff time as short as possible.

If it is determined that the elapsed time since a transition to the cut-off state is equal to or longer than the predetermined time (S9: YES), the processing proceeds to S11. In contrast, if it is determined that the elapsed time from the transition to the cut-off state is shorter than the predetermined time (S9: NO), the processing proceeds to S10.

In S10, the CPU 41 continues the cut-off state in which the current to the electric motor 7 is cut off, and assigns 0 as the value of the "command current (thermal protection)". The "command current (thermal protection)" is a value indicating a value of a current to be supplied to the electric motor 7 at the current time, but the "command current (thermal protection)" is not necessarily indicated to the motor drive circuit 32 as a control signal, but is corrected in S12 to be described later so that there is no rapid change in current, and then output to the motor drive circuit 32 as a control signal (S13).

On the other hand, in S11, the CPU 41 returns from the cut-off state in which the current to the electric motor 7 is cut off, and assigns, as a value of the "command current (thermal protection)", a value of a current that is required to be supplied to the electric motor 7 in order to bring a current actual steering angle of the rear wheels close to the target rear wheel steering angle. Here, the current value assigned in S11 is determined based on a current actual steering angle and a difference between the current actual steering angle and the target rear wheel steering angle. That is, the larger the steering angle, the greater a torque required to further change the steering angle from that steering angle, and therefore, as the actual steering angle increases, the current value that is required to be supplied to the electric motor 7 to steer also increases. The larger the difference between the actual steering angle and the target rear wheel steering angle, the greater a torque is required to quickly approach the target rear wheel steering angle. Therefore, as the difference between the actual steering angle and the target rear wheel steering angle becomes larger, a value of a current that is required to be supplied to the electric motor 7 in order to approach the target rear wheel steering angle also becomes larger. In particular, in the present embodiment, an actual steering angle is detected in real time using the resolver 27 and the stroke sensor 28 to execute feedback control, and a value of a current that is required to be supplied to the electric motor 7 to bring a current actual steering angle of the rear wheels close to the target rear wheel steering angle is set based on the feedback control. Similarly to S7, the "command current (thermal protection)" is not necessarily indicated to the motor drive circuit 32 as a control signal, but is corrected in S12 to be described later so that there is no rapid change in current, and then output to the motor drive circuit 32 as a control signal (S13). Thereafter, the processing proceeds to S12.

In S11, the CPU 41 reads out State, which is a parameter indicating a current control state of the vehicle control device 1, from the RAM 42, and sets "under feedback control" indicating that the vehicle control device 1 shifts to the energized state. Thereafter, the processing proceeds to S12.

In S12, the CPU 41 calculates a "command current (output value)" to be indicated to the motor drive circuit 32 as a value of a current to be supplied to the electric motor 7. Specifically, the value is calculated by the following formulas (1) and (2) with reference to the "command current (thermal protection)" set in S7, S8, S10 and S11.

Command current change amount=(command current (thermal protection)−previous value of command current (output value)) with upper limit processing, that is, if the command current change amount exceeds an upper limit value, the upper limit value is used as the command current change amount (1)

Command current (output value)=previous value of command current (output value)+command current change amount (2)

Figure 9:
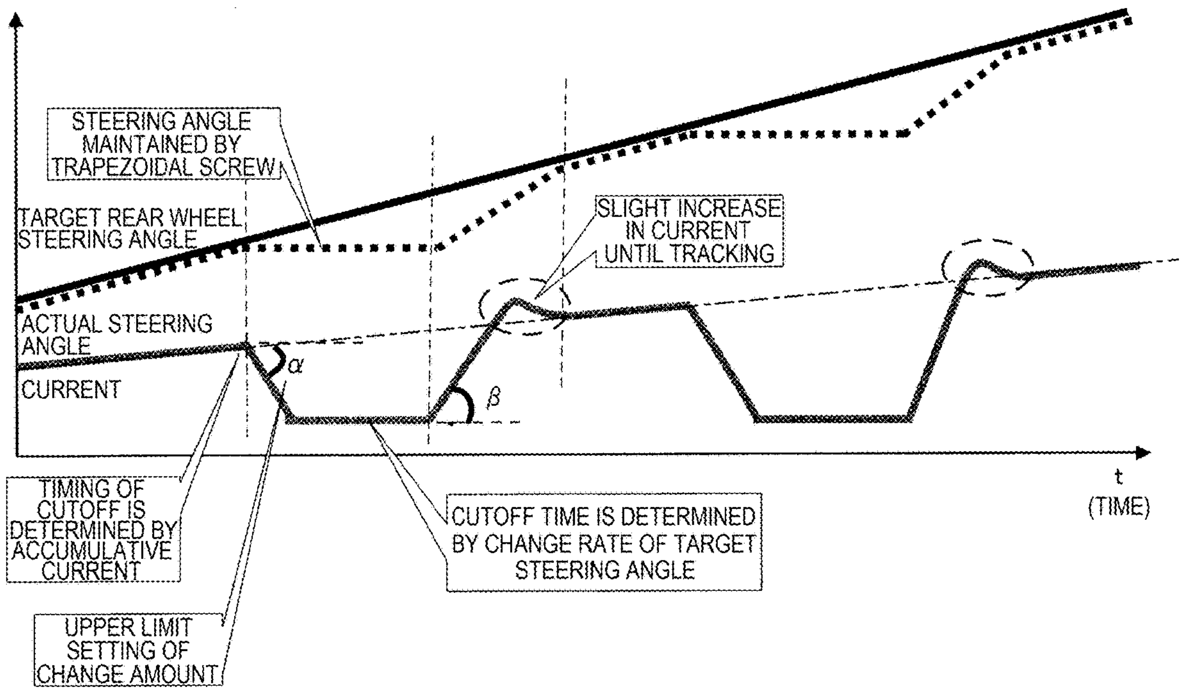
FIG. 9 is a diagram showing an example of transitions of a target rear wheel steering angle, an actual steering angle, and a current value supplied to an electric motor 7 when vehicle control according to the vehicle control processing program is executed.

According to the above formulas (1) and (2), a value close to the "command current (thermal protection)" is the "command current (output value)" as much as possible within a range in which a change amount of current per unit time does not exceed the upper limit value. The upper limit value of the change amount of current is preferably set to a value as large as possible within a range in which sound or vibration does not occur. Here, when a torque of the electric motor 7 rapidly changes, there is a problem that sound or vibration is generated by contact of internal components. In S12, by setting an upper limit value to the change amount of the current, occurrence of such sound or vibration is prevented. Further, as shown in FIG. 9, an upper limit $\alpha$ of a change amount in a process of reducing a current amount when shifting from an energized state to a cut-off state and an upper limit $\beta$ of a change amount in a process of increasing a current amount when shifting from the cut-off state to the energized state may be different values. For example, for the upper limit $\alpha$ of the change amount when the current amount is reduced, a value as large as possible within a range in which sound or vibration does not occur is set as a fixed value. On the other hand, the upper limit $\beta$ of the change amount when the current amount is increased is set within a range in which no sound or vibration is generated, taking into consideration a difference between an actual steering angle and the target rear wheel steering angle when returning from the cut-off state. That is, the upper limit $\beta$ of the change amount when the current amount is increased is not a fixed value, but varies depending on, for example, a change rate of the target rear wheel steering angle or a time during which the current is cut off (the predetermined time in S9).

Thereafter, in S13, the CPU 41 transmits a control signal to instruct the motor drive circuit 32 of the electric motor 7 to supply a current to the electric motor 7. The control signal includes a "command current (output value)" as a target value of a current amount to be supplied. In the motor drive circuit 32 that receives the control signal, a target current value of the electric motor 7 is set to the "command current (output value)", and a current value detected by the motor current sensor 46 is fed back to control a duty ratio of a switching element of the motor drive circuit 32 so that the current value becomes the target current value.

As a result, particularly in the energized state (even in the cut-off state, there is a case where the electric motor 7 is driven immediately after switching from the energized state), as described above, a current flows through the stator 31 and the electric motor 7 is driven, and rotational motion of the electric motor 7 is converted into linear motion in the axial direction for steering the rear wheels, thereby steering the rear wheels 9C, 9D, and particularly steering the rear wheels 9C, 9D so that the actual steering angle becomes the target rear wheel steering angle. On the other hand, in the cut-off state, drive of the electric motor 7 is stopped. As shown in FIG. 4, in the present embodiment, the trapezoidal screw 26 is provided in the rear wheel steering device 8, and when the electric motor 7 is not driven, even if a large force is applied from an outside, a current steering angle of the rear wheels is maintained.

Thereafter, in S14, it is determined whether the vehicle stops traveling, and if the vehicle does not stop traveling (S14: NO), the processing returns to S1 and traveling control of the vehicle is continuously executed. The processing from S1 onwards is repeatedly executed at intervals of, for example, 10 msec while the vehicle is traveling. In contrast, if the vehicle stops traveling (S14: YES), the vehicle control processing program ends.

Next, a specific example of vehicle control according to the vehicle control processing program will be described. FIG. 9 shows an example of transitions of a target rear wheel steering angle, an actual steering angle, and a current value supplied to an electric motor 7 when the vehicle control according to a vehicle control processing program is executed. A horizontal axis represents an elapsed time. The example shown in FIG. 9 particularly shows a case where a driver steers the steering wheel slowly over a long time, that is, a case where the target rear wheel steering angle gradually increases in proportion to the elapsed time.

As shown in FIG. 9, when the driver steers the steering wheel and a new target rear wheel steering angle is set, the actual steering angle and the target rear wheel steering angle are different, so it is determined that the rear wheels are required to be steered (S4: YES), and power supply to the electric motor 7 is started. Since the torque required for steering is proportional to the actual steering angle at that time, an amount of electric power required to be supplied to the electric motor 7 basically increases gradually with time (as the steering angle increases) as shown in FIG. 9. However, in the present embodiment, as described above, when the accumulative current supplied to the electric motor 7 after the energized state of the electric motor 7 is started reaches the threshold value (the control start value for the first time) (S6: YES), the state shifts to the cut-off state in which supply of the current to the electric motor 7 is cut off for a predetermined time.

Accordingly, it is possible to reduce the heat generation of the electric motor 7 due to the current continuously flowing for a long time. As shown in FIG. 4, in the present embodiment, the trapezoidal screw 26 is provided in the rear wheel steering device 8, and a current steering angle of the rear wheel can be maintained in the cut-off state in which the electric motor 7 is not driven, so that tracking the target rear wheel steering angle can be immediately resumed after the energized state is restored. Further, in the cut-off state, the steering angle of the rear wheels is fixed and is not synchronized with the steering wheel operation of the driver. However, since the steering wheel and the rear wheels are not mechanically connected and are connected by wire (electric communication), even if the steering angle of the rear wheels is not completely synchronized with the steering wheel operation, the situation is not noticed by the driver as the connection is not visible. In particular, in the present embodiment, duration of the cut-off state is short (for example, 100 msec), and a change amount of the actual steering angle when the current is restored is not increased, and thus the driver does not feel uncomfortable.

Since a timing of shifting to the cut-off state is determined by the accumulative current, the larger the current amount, the shorter an interval of shifting from the energized state to the cut-off state. On the other hand, as shown in FIG. 8, the predetermined time during which the cut-off state continues is determined by the change rate of the target rear wheel steering angle, and if a change rate of the target rear wheel steering angle is fast, a change amount of the actual steering angle when a current is restored becomes large if a period during which the current is cut off is long, and therefore, a current cutoff time is set as short as possible.

Since the upper limit value is set for the change amount of the current (the angles $\alpha$ and $\beta$ in FIG. 9) when shifting from the energized state to the cut-off state and shifting from the cut-off state to the energized state, it is possible to prevent sound or vibration caused by a sudden change in the torque of the electric motor 7.

Further, in particular, when shifting from the cut-off state to the energized state, immediately after returning to the energized state, as shown in FIG. 9, a current slightly larger than an originally required current amount is supplied. Accordingly, even if a large difference occurs between the actual steering angle and the target rear wheel steering angle immediately after returning to the energized state, the actual steering angle can be quickly brought close to the target rear wheel steering angle, and tracking the target rear wheel steering angle can be resumed.

As described above in detail, the vehicle control device 1 and a computer program executed by the vehicle control device 1 according to the present embodiment have the electric motor 7 that generates a steering force for steering the rear wheels, and the trapezoidal screw 26 that converts the rotational motion generated based on the drive of the electric motor 7 into linear motion in the axial direction for steering the rear wheels, and set a target steering angle of the rear wheels based on the steering of the steering wheel by the driver (S2), detect the current steering angle of the rear wheels (S3), and when the target steering angle of the rear wheels is different from the current steering angle of the rear wheels, execute control to alternately switch between an energized state in which a current is supplied to the electric motor 7 so that the current steering angle of the rear wheels approaches the target steering angle and a cut-off state in which the current to the electric motor 7 is cut off, based on the accumulative current supplied to the electric motor 7 (S5 to S13). Therefore, regardless of a steering mode of the steering wheel by the driver, it is possible to reduce power consumption of the electric motor 7 under a necessary condition and prevent overheating of the electric motor 7. Since a current steering angle of the rear wheel can be maintained by the trapezoidal screw in the cut-off state in which the electric motor 7 is not driven, tracking the target steering angle can be immediately resumed after the energized state is restored.

First control of switching from the energized state to the cut-off state at a timing when the accumulative current supplied to the electric motor 7 after the energized state is started reaches the threshold value and second control of returning from the cut-off state to the energized state after a predetermined time elapses from the cut-off state are repeatedly executed to alternately switch between the energized state and the cut-off state (S5 to S13). Therefore, by managing the energized state according to a current amount flowing through the electric motor 7, it is possible to prevent the electric motor 7 from overheating.

When the target steering angle changes over time, by setting the predetermined time to be shorter as the change rate becomes faster, it is possible to prevent the target steering angle and the actual steering angle from greatly deviating from each other when returning from the cut-off state to the energized state, that is, preventing the actual steering angle from greatly changing when returning from the cut-off state to the energized state.

In a case of switching from the energized state to the cut-off state and in a case of switching from the cut-off state to the energized state, a change amount in the current supplied to the electric motor 7 per unit time is controlled to be less than an upper limit value, and thus it is possible to prevent sound or vibration caused by a sudden change in a torque of the electric motor 7.

It is to be understood that this disclosure is not limited to the above-described embodiment, and various improvements and modifications can be made without departing from the scope of this disclosure.

For example, in the present embodiment, the cut-off state is a state in which the supply of the current to the electric motor 7 is set to 0, but there is no problem even if a slight current flows as long as heat generation from the electric motor 7 can be reduced. That is, the cut-off state may be a state in which a current amount supplied to the electric motor 7 is smaller than that in the energized state.

In the present embodiment, a vehicle adopting the 4WS in which the steering angles of the front and rear wheels are controlled based on steering of the steering wheel by the driver is exemplified, but a vehicle does not necessarily have to be a vehicle adopting the 4WS as long as the rear wheels of the vehicle can be steered.

In the present embodiment, a subject that executes the vehicle control processing program shown in FIG. 4 is the rear wheel steering ECU 6 that is a dedicated electronic control unit for steering the rear wheels, but some or all of the processing may be executed by an integrated control ECU that controls the entire vehicle. Alternatively, another vehicle-mounted device such as a navigation device may be the execution subject. A part of the processing may be executed by an external server device.

A vehicle control device according to this disclosure includes: an electric steering actuator configured to generate a steering force for steering a rear wheel; a trapezoidal screw configured to convert rotational motion generated based on drive of the steering actuator into linear motion in an axial direction for steering the rear wheel; a target steering angle setting unit configured to set a target steering angle of the rear wheel based on steering of a steering wheel by a driver; a steering angle detection unit configured to detect a current steering angle of the rear wheel; and an energization control unit configured to control an energized state of the steering actuator. The energization control unit executes control of alternately switching between an energized state in which a current is supplied to the steering actuator and a cut-off state in which the current to the steering actuator is cut off, when steering is being performed in a direction away from a neutral and the target steering angle of the rear wheel is different from the current steering angle of the rear wheel, and a value of a current supplied to the steering actuator in the energized state gradually increases with time.

Here, the expression "current is cut off" does not necessarily mean that the current supplied to the steering actuator is completely set to 0, but may mean keeping the current less than that in the energized state.

According to the vehicle control device according to this disclosure having the configuration, by alternately switching between the energized state in which the current is supplied to the steering actuator and the cut-off state in which the current to the steering actuator is cut off, it is possible to reduce power consumption of the steering actuator under a necessary condition and prevent overheating of the steering actuator, regardless of a steering mode of the steering wheel of the driver. Since a current steering angle of the rear wheel can be maintained by the trapezoidal screw in the cut-off state in which the steering actuator is not driven, tracking the target steering angle can be immediately resumed after the energized state is restored.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle control device comprising:

an electric steering actuator configured to generate a steering force for steering a rear wheel;

a trapezoidal screw configured to convert rotational motion generated based on drive of the steering actuator into linear motion in an axial direction for steering the rear wheel;

a processor configured to set a target steering angle of the rear wheel based on steering of a steering wheel by a driver;

a steering angle detector configured to detect a current steering angle of the rear wheel; and an energization controller configured to control an energized state of the steering actuator, wherein the energization controller executes control of alternately switching between an energized state in which a current is supplied to the steering actuator and a cut-off state in which the current to the steering actuator is cut off, when steering is being performed in a direction away from a neutral and the target steering angle of the rear wheel is different from the current steering angle of the rear wheel, and a value of a current supplied to the steering actuator in the energized state gradually increases with time, wherein the energization control unit executes the control of alternately switching between the energized state and the cut-off state while the target steering angle is in the direction away from the neutral.

2. The vehicle control device according to claim 1, wherein the energization controller controls switching between the energized state and the cut-off state based on an accumulative current supplied to the steering actuator.

3. The vehicle control device according to claim 2, wherein the energization controller alternately switches between the energized state and the cut-off state by repeatedly executing first control of switching from the energized state to the cut-off state at a timing when the accumulative current supplied to the steering actuator after the energized state is started reaches a threshold value, and second control of returning from the cut-off state to the energized state after a predetermined time elapses from when the cut-off state is set.

4. The vehicle control device according to claim 3, wherein when the target steering angle changes over time, the energization controller sets the predetermined time to be shorter as a change rate of the target steering angle increases.

5. The vehicle control device according to claim 1, wherein the energization controller executes control such that a change amount of the current supplied to the steering actuator per unit time is less than an upper limit value when switching from the energized state to the cut-off state and when switching from the cut-off state to the energized state.

6. The vehicle control device according to claim 2, wherein the energization controller executes control such that a change amount of the current supplied to the steering actuator per unit time is less than an upper limit value when switching from the energized state to the cut-off state and when switching from the cut-off state to the energized state.

7. The vehicle control device according to claim 3, wherein the energization controller executes control such that a change amount of the current supplied to the steering actuator per unit time is less than an upper limit value when switching from the energized state to the cut-off state and when switching from the cut-off state to the energized state.

8. The vehicle control device according to claim 4, wherein the energization controller executes control such that a change amount of the current supplied to the steering actuator per unit time is less than an upper limit value when switching from the energized state to the cut-off state and when switching from the cut-off state to the energized state.

9. The vehicle control device according to claim 1, wherein the energization control unit executes the control of alternately switching between the energized state and the cut-off state to reduce heat generation of the steering actuator.

10. The vehicle control device according to claim 2, wherein the energization control unit switches from the energized state to the cut-off state at a timing when the accumulative current supplied to the steering actuator after the energized state is started reaches a control start value, and thereafter alternately switches between the energized state and the cut-off state at a timing when the accumulative current reaches a threshold value smaller than the control start value.

* * * * *